US012802667B2

(12) United States Patent
Gay

(10) Patent No.: US 12,802,667 B2
(45) Date of Patent: Nov. 17, 2026

(54) IMPEDANCE VARIATOR FOR A WIND INSTRUMENT

(71) Applicant: André Gay, Marseilles (FR)

(72) Inventor: André Gay, Marseilles (FR)

( * ) Notice: Subject to any disclaimer, the term of this patent is extended or adjusted under 35 U.S.C. 154(b) by 294 days.

(21) Appl. No.: 18/692,067

(22) PCT Filed: Sep. 13, 2022

(86) PCT No.: PCT/EP2022/075412
§ 371 (c)(1),
(2) Date: Mar. 14, 2024

(87) PCT Pub. No.: WO2023/041528
PCT Pub. Date: Mar. 23, 2023

(65) Prior Publication Data

US 2025/0201216 A1 Jun. 19, 2025

(30) Foreign Application Priority Data

Sep. 14, 2021 (FR) ...................................... 2109603

(51) Int. Cl.
*G10D 9/01* (2020.01)
*G10D 7/10* (2006.01)

(52) U.S. Cl.
CPC ................. *G10D 9/01* (2020.02); *G10D 7/10* (2013.01)

(58) Field of Classification Search
CPC .. G10D 9/01; G10D 7/10; G10D 9/00; G10D 7/00
See application file for complete search history.

(56) References Cited

U.S. PATENT DOCUMENTS

| | | | | |
|---|---|---|---|---|
| 8,278,540 | B1 | 10/2012 | Chen | |
| 9,721,546 | B2 | 8/2017 | Laukat et al. | |
| 10,013,958 | B2 | 7/2018 | Satterlee | |
| 2015/0243265 | A1* | 8/2015 | Laukat .................... | G10D 7/00 84/398 |
| 2017/0256243 | A1 | 9/2017 | Satterlee | |

FOREIGN PATENT DOCUMENTS

DE 202012010318 U1 2/2013

OTHER PUBLICATIONS

International Search Report mailed Jan. 5, 2023, in corresponding International Application No. PCT/EP2022/075412, 5 pages.

* cited by examiner

*Primary Examiner* — Kimberly R Lockett
(74) *Attorney, Agent, or Firm* — Maier & Maier, PLLC

(57) ABSTRACT

An impedance variator for suppressing the parasitic harmonics of a wind musical instrument, the impedance variator including at least one permanent magnet, the impedance variator including at least two brass bearing plates separated from each other by a brass tube, the tube including a manner for setting the distance between the two plates, and each of the two plates being intended to bear respectively against two wall portions of the wind instrument extending substantially parallel to one another.

9 Claims, 5 Drawing Sheets

[Fig. 1]
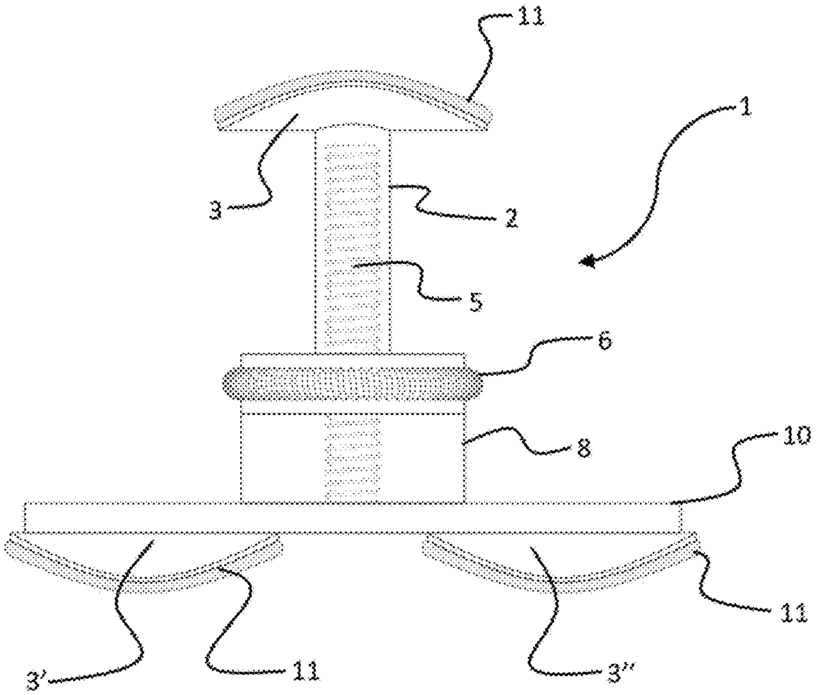
[Fig. 2]
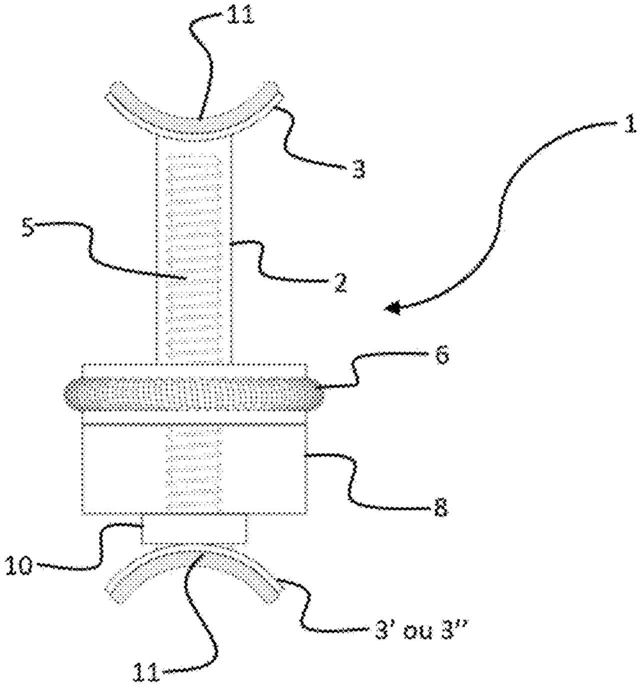

[Fig. 3]
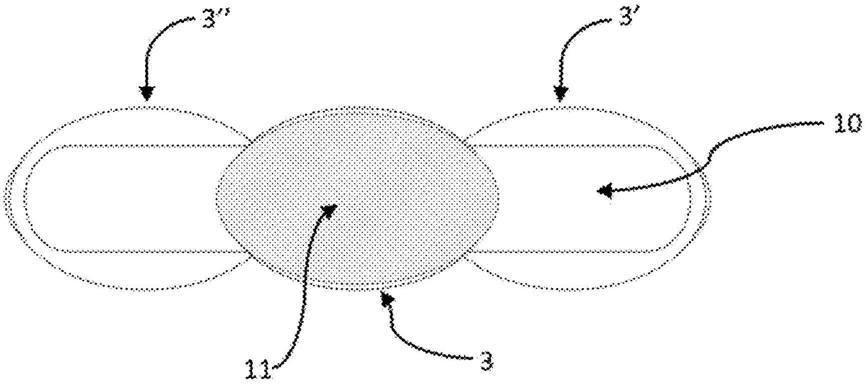
[Fig. 4]
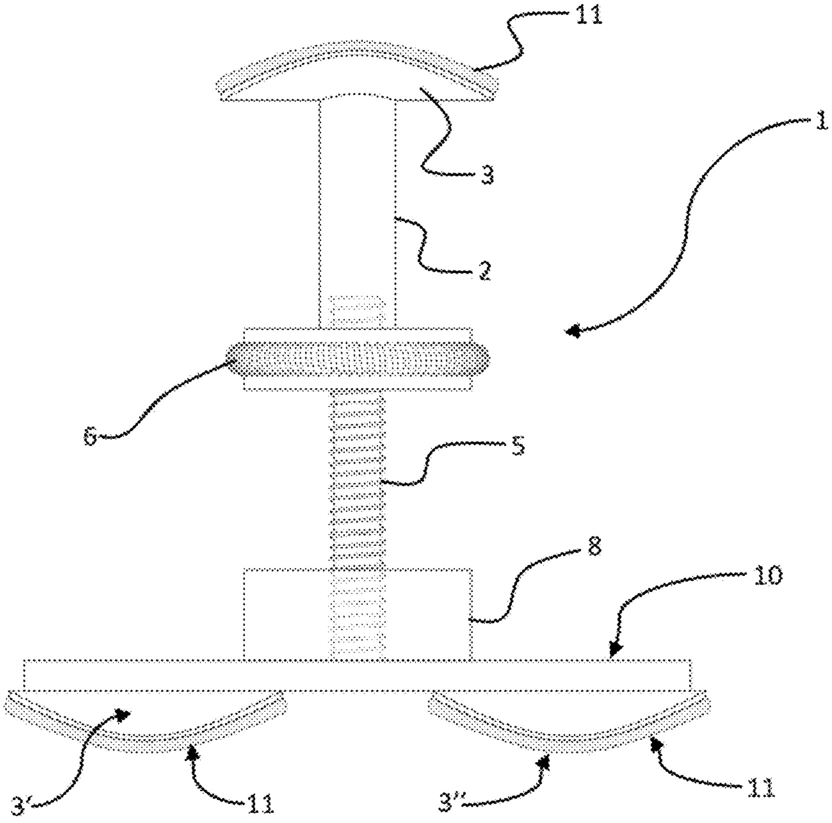

[Fig. 5]
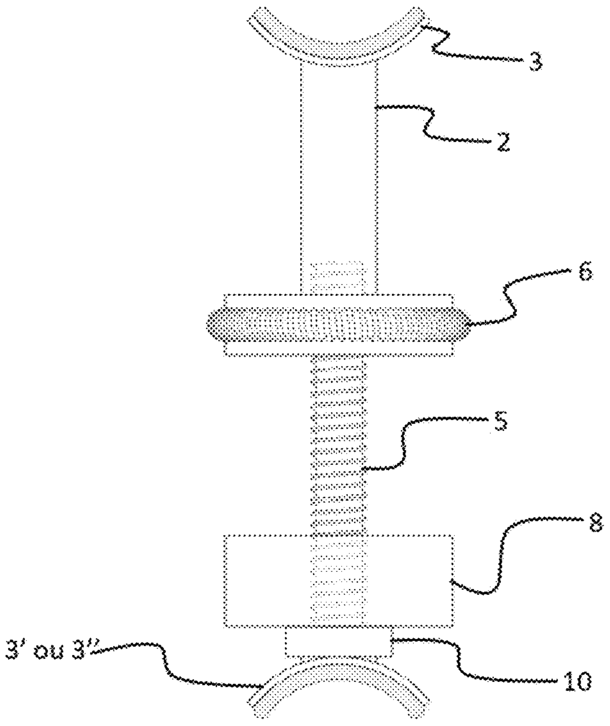

[Fig. 6]
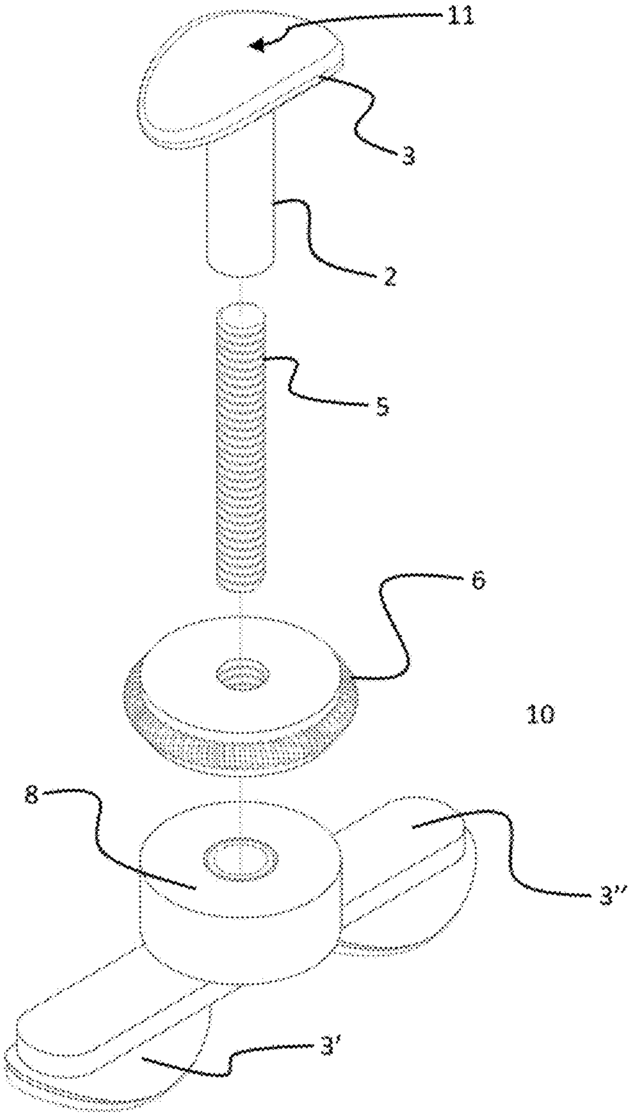
[Fig. 7]
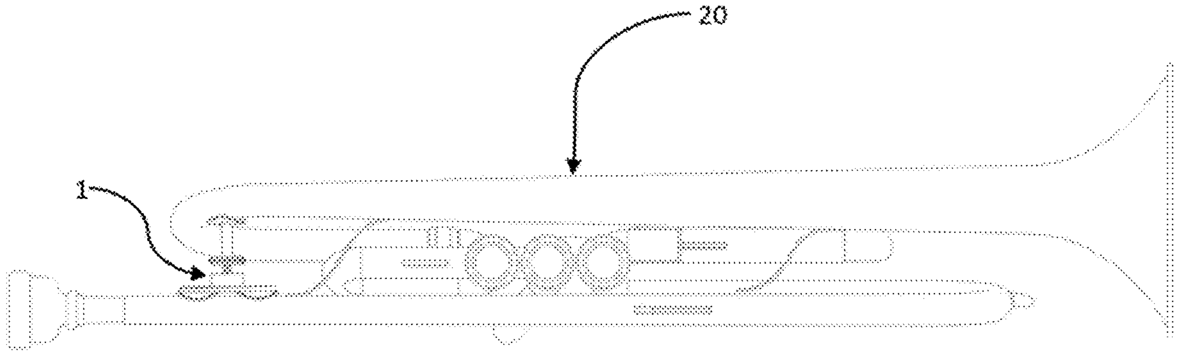

[Fig. 8]
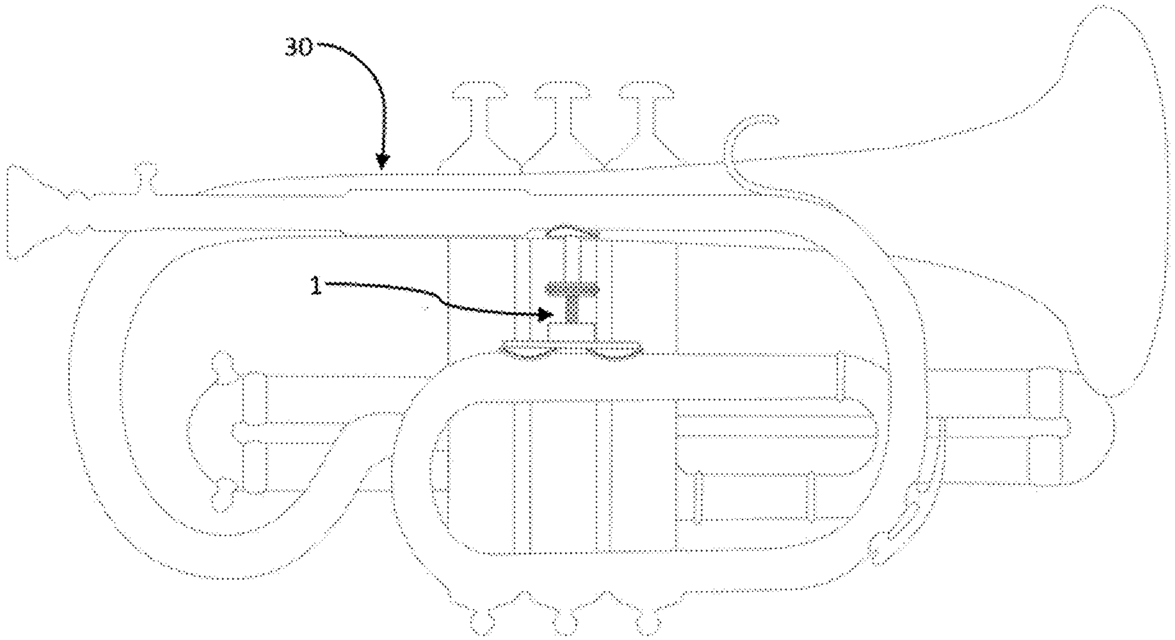

IMPEDANCE VARIATOR FOR A WIND INSTRUMENT

TECHNICAL FIELD

An object of the present invention is an impedance variator for a wind instrument.

It relates to the technical field of impedance variator apparatuses whose function aims to limit non-harmonic sounds, in other words to suppress parasitic harmonics. The present invention also relates to a wind instrument including such an impedance variator, more particularly the impedance variator according to the invention is in particular, yet not exclusively, intended for a trumpet or a horn.

BACKGROUND

During the manufacture of a wind instrument, the luthier focuses on the correctness, the timbre and the ease of play of the instrument. This results in an impedance, but of course each musician practices differently with the same wind instrument. For example, besides the technique, each musician has a different blow so that parasitic harmonics are likely to appear with some musicians rather than others for the same instrument. Thus, an impedance variator will allow limiting its parasitic harmonics by being placed on a specific portion of the instrument.

Impedance variators are known in the prior art such as:

- the “Variospec”: this impedance variator is no longer used at the current time, but it requires a modification of the instrument with drilling and welding.
- the “Lefreque” system: this impedance variator is used for wind instruments, but it has a very large number of different materials that the musician should select to obtain the desired sound. Moreover, this impedance variator comprises the assembly of two plates together with elastic bracelets, which is complex and not visually aesthetic.

In the prior art, document U.S. Pat. No. 10,013,958 is also known which describes an impedance variator for a saxophone. This impedance variator is fastened between two branches of the saxophone and comprises a complex assembly of round and circular parts on top of one another.

Document U.S. Pat. No. 8,283,541 is known which describes a ligature for wood-made wind instruments allowing reducing the frequencies of interfering vibrations. This ligate comprises a flexible strip made of brass but this device does not comprise any permanent magnet. Moreover, this ligature should be fastened on the spout of the wind instrument.

Document U.S. Pat. No. 7,220,903 is also known which discloses an assembly for a wind instrument spout wherein a retention plate provided with tabs conforms to the shape of the grooves present on the spout. This plate is adjustable through a screwing action to apply a variable pressure on the base of the blade.

Finally, documents U.S. Pat. Nos. 7,220,903, 8,217,248, 5,644,095, JP 5400241, U.S. Pat. Nos. 9,721,546 and 4,428,271 are known but all these solutions described in these documents are not very effective, not very aesthetic, often complex, barely resistant, not practical to install/mount and/or difficult to calibrate.

Document U.S. Pat. No. 8,278,540 is also known which describes no permanent magnet or any brass element as well as document U.S. Pat. No. 10,013,958 which in no case provides for the use of a magnet and of a nonmagnetic component—the brass elements—so that there is no magnetic interaction/attraction between the permanent magnet and the brasses. Finally, the devices of these two documents are not removable so that the user cannot fasten it where he/she cannot fasten it where he/she wishes on the wind instrument.

The invention aims to remedy this situation.

In particular, an objective of the invention is to provide an impedance variator that is easy to set up on the wind instrument and very effective to reduce and possibly suppress non-harmonic sounds.

An essential objective is to provide a simple variator, having only few parts or components.

A complementary objective is to provide a low-cost impedance variator.

SUMMARY

Thus it has been noticed by the Applicant, after various experiments and manipulations, that it is particularly interesting to make an impedance variator in the form of a brass tube separating at least two brass plates located at the two opposite ends of the tube, the variator being arranged or fastened on the wind instrument respectively against two wall portions of the wind instrument extending substantially parallel to one another, said impedance variator also being fitted with a permanent magnet.

The solution proposed by the invention is an impedance variator for limiting or suppressing the parasitic harmonics of a wind musical instrument, the impedance variator including at least one permanent magnet.

The impedance variator is remarkable in that it comprises at least two brass bearing plates separated from one another by a brass tube, said tube including a means for setting the distance between the two plates, and in that each of the two plates is intended to bear respectively against two wall portions of the wind instrument extending substantially parallel to one another By “substantially parallel to one another”, it should be understood that these two walls face one another in a parallel or substantially parallel manner, i.e. a parallelism with an angle comprised between 0° and 20° on the considered portion where the impedance variator is mounted.

Thanks to the impedance variator according to the invention, the parasitic harmonics are suppressed by a simple, optimum mounting and setting with regards to the result and generally final, i.e. which does not require any other subsequent setting.

A remarkable effect of the device according to the invention lies in the sound timbre which is particularly significantly improved.

Moreover, this impedance variator fits perfectly to the wind instrument and is visually difficult to detect, brass having a colour that is very close to the colour of the wind instrument.

Furthermore, this impedance variator can be dismounted very easily and quickly, in particular in order to transfer it onto another wind instrument.

It should be noted herein that impedance measurement tests at the outlet of the wind instrument have been carried out and show a very significant improvement of this impedance at the outlet, in other words the parasitic sounds are properly suppressed. The result is a round, full, powerful sound, facilitating the play of the instrumentalist over the entirety of the tessitura of the instrument.

Thus, the impedance variator, also referred to as “booster” with regards to its effect on the sound timbre, has been tested in Cite de la Musique in Marseille and has demonstrated exceptional qualities. In particular, the feeling with regards to the suppression of parasitic harmonic frequencies is immediate and the impedance variator or Booster according to the invention facilitates the accuracy of note attacks. Furthermore, the sound is rounded and access to the serious and acute registers is substantially facilitated.

The impedance variator or booster has also been tested, in particular on trombones, trumpets and flutes, with the musicians of Opera de Toulon and the Ad Libitum quintet. The results and feelings are identical, i.e. excellent like those of Cite de la Musique.

Similarly, quite many professionals have carried out very conclusive tests on saxophones.

In particular, one could note that the general feeling of musicians and listeners is that the vibration of the air column requires less blowing, the sound timbre is modified and access to the entirety of the tessitura is substantially facilitated. The removable nature of the impedance variator or booster—in other words the possibility of placing it at different locations on the instrument—allows optimising the setting.

For simplicity, the data of the tests and their results are not described herein, but are available on demand.

Moreover, the particular setting of the impedance variator belongs to each musician to the extent that the latter wishes a more or less brilliant or higher or lower sound. To do so, the impedance variator will be arranged at different locations on the instrument and mounted more or less tightened against two opposite walls or branches (opposite one another) of the instrument.

Other advantageous features of the apparatus object of the invention are listed hereinbelow. Each of these features may be considered alone or in combination with the remarkable features defined hereinabove. Each of these features contributes, where appropriate, to the resolution of specific technical problems defined hereinbefore in the description and to which the remarkable features defined hereinabove do not necessarily contribute. The latter may, where appropriate, be the object of one or more divisional patent application(s):

According to an advantageous embodiment, the impedance variator comprises a brass spar fastened to an end of said tube, one of said bearing plates being fastened on the spar. More specifically, this bearing plate is fastened under the spar.

According to this embodiment, preferably, the impedance variator comprises three brass bearing plates, two of said bearing plates being fastened to said spar whereas the last bearing plate is fastened to the free end of said tube.

Advantageously, the means for setting the distance between the bearing plates consists of a threaded spindle mounted in the brass tube and a setting knob mounted free in rotation on the threaded spindle to set this distance, advantageously, the knob is made of brass.

Advantageously, the permanent magnet has a cylinder shape and is fastened against or on said spar.

According to an advantageous technical feature, the permanent magnet is fixedly mounted between said brass spar and the means for setting the distance between the bearing plates.

Advantageously, the bearing plates include, on their faces bearing against a portion of the instrument, a non-metallic lining, preferably this lining is made of cork.

Such a non-metallic lining allows, on the one hand, not damaging the wind instrument and, on the other hand, fastening or mounting with pressure the impedance variator between the two substantially parallel portions of a wind instrument more effectively.

Preferably, the outer surface of the brass plates, of the brass tube, possibly of the brass spar as well as of the setting knob, are varnished or platinised or plated with silver or gold, advantageously the silver or gold plating having a thickness of 6 microns.

Advantageously, the permanent magnet has an external diameter comprised between 12 and 18 mm, preferably 15 mm, and a thickness comprised between 4 and 8 mm, preferably 6 mm.

The present invention also relates to a wind instrument, preferably consisting of a trumpet or a horn, having an impedance variator as briefly described hereinabove, fastened between two wall portions of said wind instrument extending substantially parallel to one another.

BRIEF DESCRIPTION OF THE FIGURES

Other advantages and features of the invention will appear more clearly upon reading the description of a following preferred embodiment, with reference to the appended drawings, made as indicative and non-limiting examples and wherein:

FIG. 1 is a schematic illustration of an embodiment of an impedance variator according to the invention when the latter is in the low position, the setting knob being in contact with the permanent magnet.

FIG. 2 is a profile view of the impedance variator shown in FIG. 1.

FIG. 3 is a top view of the impedance variator shown in FIG. 1.

FIG. 4 is a schematic illustration of an embodiment of the impedance variator shown in FIGS. 1 to 3 when the latter is in the high position.

FIG. 5 is a profile view of the impedance variator shown in FIG. 4.

FIG. 6 is an exploded view of the impedance variator according to the invention depicted in the appended figures showing all of the elements that compose it or it comprises.

FIG. 7 is a schematic view of a trumpet on which an impedance variator according to the invention is mounted or fastened.

FIG. 8 is a schematic view of a horn on which an impedance variator according to the invention is mounted or fastened.

DETAILED DESCRIPTION OF THE EMBODIMENTS

The impedance variator 1 comprises a brass tube 2 at the two ends of which two plates 3, 3' are fastened, the brass tube 2 accommodating a means 5, 6 for setting the spacing distance between the two plates 3, 3'.

In this case, the impedance variator 1 includes a brass spar 10 on which two plates 3', 3" are fastened, instead of one single plate.

Each of the three plates 3, 3', 3" has identical shape and dimensions. A plate 3, 3' or 3" is intended to bear against a wall portion of a wind instrument, this is why their shapes are adapted to that of the wall portion on which they are brought to come into contact. Thus, a plate 3, 3' or 3" has a substantially semi-cylindrical shape with a central portion wider than the end portions.

According to one embodiment, a plate 3, 3' or 3' has a length of 18 mm (millimetres) for a maximum width of 12 mm. The height of a plate 3, 3' or 3", i.e. when it is placed for example on a flat or horizontal support, is greater than 3 mm, more specifically equal to 3.3 mm.

As indicated before, the internal face of the plates 3, 3', 3", namely the face intended to come into contact with a portion of the instrument, is fitted or provided with a non-metallic lining 11, preferably made of cork. According to the embodiment chosen to illustrate the invention, this lining 11 has a thickness of 1.5 mm. Of course, it is possible to consider a material other than cork—such as, for example, a plastic material, rubber or elastomer—but cork has the advantage of facilitating bearing of the plates 3, 3' and 3" without damaging the instrument, while being aesthetic.

According to one embodiment, the brass tube 2 has a length of 15 mm and an outer diameter of 5 mm bored at 4 mm (inner diameter). This tube 2 being hollow by nature, it accommodates a threaded spindle 5, fastened to the brass spar 10, having an outer diameter of 4 mm so as to cooperate with the inner diameter of the brass tube 2. Still according to an embodiment, this threaded spindle 5 has a length of 24 mm.

According to one embodiment, the means 5, 6 for setting the distance between the two end plates 3 and 3' or 3 and 3" consists of a rotary (or freely rotating) knob 6 allowing raising or lowering the brass tube 2 away from the permanent magnet 8 or on the contrary against the permanent magnet 8 so as to make the distance separating these two plates 3 and 3' or 3 and 3" vary, more specifically the pair of plates 3', 3" fastened on the spar 10 and the plate 3 fastened directly to an end of the brass tube 2.

In FIGS. 1 and 2, the setting knob 6 is in contact with the permanent magnet 8, and therefore proximate to the spar 10, so that the distance between the pair of plates 3', 3" under the spar 10 and the plate 3 on the end of the brass tube 2 is minimum, in this case 25 mm. In FIGS. 4 and 5, the setting knob 6 is at a distance from the permanent magnet 8, and therefore from the spar 10, the maximum distance between the pair of plates 3', 3" and the plate 3 at the opposite end of the brass tube 2 being 45 mm. Of course, such a spacing between the minimum and maximum distance, i.e. between 25 mm and 45 mm, allows mounting and fastening the impedance variator 1 in or on most wind instruments provided with at least two portions facing one another substantially parallel to one another, but it is possible to provide for a larger or on the contrary smaller distance. This variable distance 25 mm to 45 mm adapts in particular to trumpets 20 or horns 30.

In one embodiment, the brass spar 10, on which or under which two plates 3', 3" are fastened is in the form of a parallelepiped with a length of 44 mm, a width of 7 mm and a thickness of 2 mm. The permanent magnet 8 and the threaded spindle 5 are fastened on the spar 10 so that the brass tube 2 extends along an axis perpendicular to the plane (along the direction defining the length and the direction defining the width) or to the axis of extension (in the lengthwise direction) of the brass spar 10.

Advantageously, the permanent magnet 8 is fastened on the brass spar 10 and has, in the embodiment chosen to illustrate the invention, the following dimensions:

an inner diameter of 5.5 mm, an outer diameter of 15 mm, a thickness of 6 mm.

Advantageously, the permanent magnet 8 is a neodymium magnet. The permanent magnet 8 has an inner bore to let the threaded spindle 5 pass throughout the magnet 8.

Fastening of the elements to one another, in particular fastening of the brass tube 2 on a brass plate 3, 3' or 3", fastening of the permanent magnet 8 on the brass spar 10 and fastening of the pair of plates 3', 3" under the spar 10 is done according to methods and means well-known to a person skilled in the art, for example by welding, crimping or by gluing; the fastening modes may of course vary to fasten two types of the aforementioned elements.

The dimensions of the aforementioned elements—in the specific embodiment or in their more general or wide range—are advantageous to achieve the main effect of the impedance variator 1, namely the limitation and possibly the suppression of parasitic sounds. Of course, these dimensions are primarily important for the plates 3, 3', 3", the brass tube 2 and the permanent magnet 8 and then advantageously for the brass spar 10.

According to another variant, the impedance variator 1 consists of two brass plates-namely two bearing plates 3, 3' or 3, 3' located at the two opposite ends of the tube-connected by a micrometric screw elevator (the means 5, 6 for setting the distance between these two plates 3, 3' or 3, 3"), namely the threaded spindle 5 and the brass tube 2. Thus, the musician places the impedance variator 1 by putting a first bearing point on the beginning of a branch of a horn 30, and a second bearing point on the same branch after the first bend 31 (FIG. 8). Thanks to its adjustability, the impedance variator 1 according to the invention can be positioned where the musician desires and with the adapted pressure on the two branches of the horn 30.

On the trumpet 20 visible in FIG. 7, the impedance variator 1 is fastened in the same manner, namely with a first bearing point (via a bearing plate 3 or a pair of bearing plates 3', 3") on a branch and a second bearing point (again via a bearing plate 3 or a pair of bearing plates 3', 3") on the bell portion of the instrument 20, as shown in this figure.

As indicated before, the impedance variator 1 may have a colour that is suitable or aesthetic with regards to the wind instrument 20 or 30, or in particular thanks to varnishing or platinising or plating with silver or gold, preferably with a thickness of 6 microns.

All of the indicated elements 2, 3, 3', 3", 10 are made of brass, namely of an alloy essentially of copper and zinc, at variable proportions. Preferably, all these elements 2, 3, 3', 3", 10 consist of the same brass, i.e. a brass having exactly the same components in the same relative amounts.

Amongst the three categories of brass, namely simple brasses or binary alloy brasses containing only copper and zinc, lead brasses containing from 1 to 3% by weight of lead and special brasses comprising in particular one or more of the elements selected from among tin, aluminium, arsenic, magnesium, nickel, iron, silicon, etc., the brass elements 2, 3, 3', 3", 10 in the impedance variator 1 according to the invention preferably consists of simple or binary alloy brasses.

Although the invention has been described in connection with several particular embodiments, it is obvious that it is in no way limited thereto and that it comprises all of the technical equivalents of the described means as well as their combinations if these fall within the scope of the invention.

The arrangement of the different elements and/or of the means and/or steps of the invention, in the above-described embodiments, should not be understood as requiring such an arrangement in all implementations. In any case, it should be understood that various modifications could be made to these elements and/or means and/or steps, without departing from the spirit and the scope of the invention. In particular:

the shape and the number of brass plates 3, 3', 3";

the making of the means 5, 6 for setting the distance between the plates 3 and 3' or 3" located opposite one another, namely on two bearing points opposite one another on the wind instrument 20 or 30, the setting means 5, 6 which may consist of a different assembly of mechanical elements or of electromechanical means such as, for example, a worm screw driven using an electric motor or at least one small hydraulic cylinder;

the permanent magnet 8 may consist of any ferromagnetic material other than a neodymium magnet and may be fastened on the brass tube 2 or directly on a plate 3, 3' or 3", it being understood that the impedance variator 1 according to the invention may have a plurality of permanent magnets 8, possibly or advantageously having different dimensions.

The use of the verb "include", "comprise" or "contain" and of its conjugated forms does not exclude the presence of other elements or other steps than those set out in a claim.

In the claims, any reference sign between brackets should not be interpreted as a limitation of the claim.

The invention claimed is:

1. An impedance variator for limiting or suppressing parasitic harmonics of a wind musical instrument, comprising:

at least two bearing plates separated from each other by a tube, said tube including a means for setting the distance between the two plates, each of the two plates being configured to bear, respectively, against two wall portions of the wind instrument extending substantially parallel to one another;

wherein:

the bearing plates and the tube are made of brass;

the impedance variator comprises a brass spar fastened to an end of the tube, one of said bearing plates being fastened on said spar; and a permanent magnet is fixedly mounted between the spar and the means for setting the distance between the plates.

2. The impedance variator according to claim 1, wherein the impedance variator comprises three brass bearing plates, two of said bearing plates being fastened to said spar and one of said bearing plates being fastened to the free end of said tube.

3. The impedance variator according to claim 1, wherein the means for setting the distance between the bearing plates is a threaded spindle mounted in the brass tube and a setting knob mounted free in rotation on the threaded spindle for setting said distance, the knob being made of brass.

4. The impedance variator according to claim 1, wherein the permanent magnet has a cylindrical shape and is fixed against or on said spar.

5. The impedance variator according to claim 2, wherein the permanent magnet is fixedly mounted between said brass spar and the means for setting the distance between the bearing plates.

6. The impedance variator according to claim 1, wherein the bearing plates include, on their faces bearing against a portion of the instrument, a non-metallic lining.

7. The impedance variator according to claim 1, wherein outer surfaces of the brass plates and of the brass tube are varnished or platinised or plated with silver or gold, the silver or gold plating having a thickness of 6 microns.

8. The impedance variator according to claim 1, wherein the permanent magnet has an external diameter between 12 and 18 mm.

9. A wind instrument, comprising a trumpet or a horn, the wind instrument having an impedance variator according to claim 1, fixed between two wall portions of said wind instrument, the wall portions extending substantially parallel to one another.

* * * * *